United States Patent
Tanaka et al.

(10) Patent No.: US 8,932,172 B2
(45) Date of Patent: Jan. 13, 2015

(54) DIFFERENTIAL AND DIFFERENTIAL ASSEMBLY METHOD

(71) Applicants: Koichi Tanaka, Okazaki (JP); Tatsuya Kawamura, Nagoya (JP); Hiroya Mizuta, Nagoya (JP); Koichi Nakamura, Toyota (JP); Rikiya Kubo, Okazaki (JP); Yoshihiko Sasaki, Okazaki (JP)

(72) Inventors: Koichi Tanaka, Okazaki (JP); Tatsuya Kawamura, Nagoya (JP); Hiroya Mizuta, Nagoya (JP); Koichi Nakamura, Toyota (JP); Rikiya Kubo, Okazaki (JP); Yoshihiko Sasaki, Okazaki (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 147 days.

(21) Appl. No.: 13/757,495

(22) Filed: Feb. 1, 2013

(65) Prior Publication Data

US 2013/0225356 A1    Aug. 29, 2013

(30) Foreign Application Priority Data

Feb. 27, 2012  (JP) .................................. 2012-039695

(51) Int. Cl.
*F16H 48/08* (2006.01)
*F16H 48/38* (2012.01)

(52) U.S. Cl.
CPC ................ *F16H 48/08* (2013.01); *F16H 48/38* (2013.01); *F16H 2048/085* (2013.01)

USPC ........................................... 475/230; 29/893.2

(58) Field of Classification Search
USPC ................................. 475/220, 230; 29/893.2
See application file for complete search history.

(56) References Cited

U.S. PATENT DOCUMENTS

| | | | |
|---|---|---|---|
| 5,186,694 A * | 2/1993 | Cooper ........................ | 475/230 |
| 6,053,835 A * | 4/2000 | Shibazaki et al. ............ | 475/160 |
| 6,254,505 B1 * | 7/2001 | Forrest ......................... | 475/230 |
| 7,025,702 B2 * | 4/2006 | Saito et al. ................... | 475/160 |
| 8,216,106 B2 * | 7/2012 | Curtis .......................... | 475/235 |
| 8,430,780 B2 * | 4/2013 | Han et al. ..................... | 475/230 |
| 2008/0242469 A1 * | 10/2008 | Jenski et al. .................. | 475/231 |

FOREIGN PATENT DOCUMENTS

| | | |
|---|---|---|
| JP | 06-080943 U | 11/1994 |
| JP | 07-091519 A | 4/1995 |
| JP | 08-312753 A | 11/1996 |

* cited by examiner

*Primary Examiner* — Jacob S Scott
(74) *Attorney, Agent, or Firm* — Gifford, Krass, Sprinkle, Anderson & Citkowski, P.C.

(57) ABSTRACT

A differential includes a pinion shaft holder, a differential case, a first side gear, a second side gear, a first spring and a second spring. The differential case includes a first side boss portion and a second side boss portion. The first spring is interposed between the first side boss portion and the first side gear. The second spring is interposed between the second side boss portion and the second side gear. A recessed portion is provided on the pinion shaft holder and is configured to avoid interference with an auxiliary tool. The auxiliary tool maintains one of the first spring and the second spring in the compressed state.

6 Claims, 10 Drawing Sheets

DIFFERENTIAL AND DIFFERENTIAL ASSEMBLY METHOD

INCORPORATION BY REFERENCE

The disclosure of Japanese Patent Application No. 2012-039695 filed on Feb. 27, 2012 including the specification, drawings and abstract is incorporated herein by reference in its entirety.

BACKGROUND OF THE INVENTION

1. Field of the Invention

The invention relates to a differential having a spring interposed in a compressed state between a surface of a side boss portion of a differential case and a surface of a side gear. The invention also relates to an assembly method of this differential.

2. Description of Related Art

With a differential according to related art described in Japanese Utility Model Application Publication No. 6-80943 (JP 6-80943 U), disc springs are interposed in a compressed state between surfaces of side boss portions of a differential case and corresponding surfaces of side gears, the surfaces opposing each other in an axial direction of the side gears. In this way, the side gears are pressed against pinion gears by the elastic restoring force of the disc springs, thereby reducing backlash between the side gears and the pinion gears.

This kind of a preload-type differential is difficult to assemble. More specifically, although not described in JP 6-80943 U, first, one side gear and the plurality of pinion gears have been set into the differential case. Then, before pinion shafts are assembled to the pinion gears in the differential case, a disc spring is interposed between the surface of one of the side boss portions of the differential case and the surface of one of the side gears, the surfaces opposing each other in the axial direction of the side gear. In the case when the disc spring is interposed, the disc spring must be compressed.

If the disc spring is not compressed, the side gear will end up being pushed upward toward the pinion gear side, with the disc spring in its natural state. As a result, the center of a center hole in this pinion gear will end up being offset with respect to the center of a through-hole for inserting the pinion shaft in the differential case. Therefore, it will be difficult to push the pinion shaft in so that it extends through both the through-hole in the differential case and the center hole in the pinion gear.

In the related art described above, the pinion shaft must be assembled to the pinion gear while the disc spring is compressed by some method, which is difficult to do and may therefore be time consuming.

SUMMARY OF THE INVENTION

The invention thus provides a differential having a spring interposed in a compressed state between a surface of a side boss portion of a differential case and a surface of a side gear, the surfaces opposing each another in an axial direction of the side gear, as well as an assembly method of this differential.

A first aspect of the invention relates to a differential that includes: a differential case having a first side boss portion and a second side boss portion; first side gear; a second side gear; a plurality of pinion gears; a first spring; a second spring; a plurality of pinion shafts; and a pinion shaft holder. The first spring is interposed in a compressed state between a surface of the first side boss portion and a corresponding surface of the first side gear, the surfaces opposing each other in an axial direction of the first side gear. The second spring is interposed in a compressed state between a surface of the second side boss portion and a corresponding surface of the second side gear, the surfaces opposing each other in an axial direction of the second side gear. Each of the plurality of pinion shafts is inserted from outside of the differential case and extends through a center hole in a corresponding one of the plurality of pinion gears and a corresponding through-hole provided in the differential case. The pinion shaft holder is arranged in a space surrounded by the plurality of pinion gears and has a plurality of through-holes into each of which an axial end portion of a corresponding one of the plurality of pinion shafts fits. The first spring applies a preload for pushing the first side gear against the plurality of pinion gears. The second spring applies a preload for pushing the second side gear against the plurality of pinion gears. Furthermore, recessed portions are provided on the pinion shaft holder and are configured to avoid interference with an auxiliary tool that keeps one of the first spring and the second spring in the compressed state.

With this structure, the possibility is reduced that, when a spring arranged between the side gear and the differential case is compressed and is maintained in this compressed state with an auxiliary tool, the auxiliary tool interferes with the pinion shaft holder that is adjacent to the side gear.

Therefore, by using the auxiliary tool, the centers of the center holes of the pinion gears and the centers of the through-holes of the pinion shaft holder are able to be concentrically aligned with the centers of the through-holes of the differential case.

Thus, the pinion shafts are able to be easily assembled extending through the through-holes of the differential case, the center holes of the pinion gears, and the through-holes of the pinion shaft holder. As a result, the assembly operation of the differential is able to be performed easily and quickly.

In this aspect of the invention, the pinion shafts are able to be assembled relatively easily, so the assembly operation of the differential is able to be performed easily and quickly. Therefore, the manufacturing cost of the differential is able to be reduced.

A second aspect of the invention relates to a differential that includes: a differential case having a side boss portion; a side gear; a pinion gear; a spring; a pinion shaft and a pinion shaft holder. The spring is interposed in a compressed state between a surface of the side boss portion and a corresponding surface of the side gear, the surfaces opposing each other in an axial direction of the side gear. The pinion shaft is inserted from outside of the differential case and extends through a center hole of the pinion gear and a through-hole of the differential case. The pinion shaft holder is a cylindrical member and has a through-hole into which an axial end portion of the pinion shaft fits. Then, a recessed portion is provided in an axial end portion of the pinion shaft holder and is recessed toward an axial center of the pinion shaft holder. The spring applies a preload for pushing the side gear against the pinion gear.

A third aspect of the invention relates to an assembly method of a differential. The differential includes a differential case having a side boss portion, a side gear, a pinion gear, a pinion shaft, a spring, and a pinion shaft holder that is a cylindrical member. The spring is interposed in a compressed state between a surface of the side boss portion and a corresponding surface of the side gear, the surfaces opposing each other in an axial direction of the side gear. Also, the pinion shaft holder has a through-hole into which an axial end portion of the pinion shaft fits. The recessed portion is recessed toward an axial center of the pinion shaft holder, on both axial end portions of the pinion shaft holder. Further, the through-hole passes through a cylindrical portion of the pinion shaft holder in a radial direction. Then, the assembly method includes: inserting an auxiliary tool from outside of the differential case into a center hole of the side boss portion; compressing the spring by hooking the auxiliary tool onto a surface of the side gear that faces the pinion shaft holder; maintaining the spring in the compressed state by the auxiliary tool; and while the spring is in the compressed state, inserting the pinion shaft from outside of the differential case so that the pinion shaft extends through a center hole provided in the pinion gear and a through-hole provided in the differential case.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings.

FIGS. 1 to 10 are views of one example embodiment of the invention. The general structure of the differential of the invention will be described with reference to FIG. 1.

Figure 1:
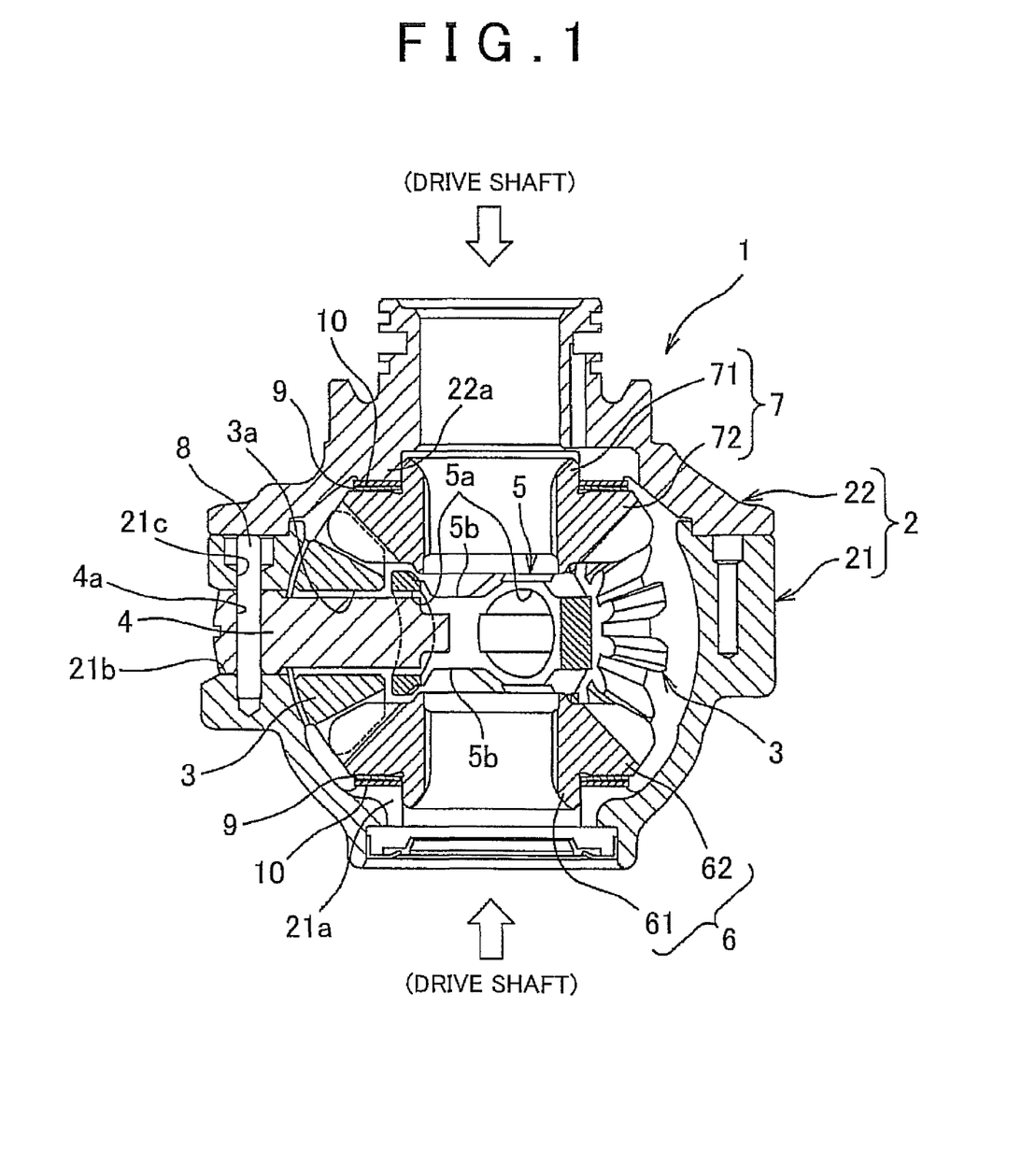
FIG. 1 is a sectional view of a differential according to one example embodiment of the invention.

In the drawing, the overall differential is denoted by reference character 1. This differential 1 transmits rotative power input from a transmission or the like, not shown, to left and right driving wheels via a pair of left and right drive shafts, also not shown.

The differential 1 described in this example embodiment is configured as a three-pinion type differential. That is, the differential 1 mainly includes a differential case 2, three pinion gears 3 (only two are shown in FIG. 1), three pinion shafts 4 (only two are shown in FIG. 1), one corresponding to each of the three pinion gears 3, one pinion shaft holder 5, and two side gears 6 and 7 and the like. In this specification, portions of the differential 1 may be referred to in the singular to facilitate understanding. For example, although the differential 1 includes the three pinion gears 3, one pinion gear among them may be referred.

The differential case 2 is a case with a spherical space therein, and has a two piece construction in which a body 21 and a cover 22 are joined together by bolts, not shown.

Although not shown, the pair of left and right drive shafts is rotatably inserted into and supported, via roller bearings, by a side boss portion 21a of the body 21 and a side boss portion 22a of the cover 22.

Through-holes 21b into which axial outer ends of the pinion shafts 4 are inserted and by which the pinion shafts 4 are supported, are formed in a plurality of locations (three locations in this example embodiment) on the outer periphery near the joining surface of the body 21. Here, the term "outer end" refers to an end portion positioned on a relatively outer side with respect to the radial direction of the spherical space.

The pinion shafts 4 are supporting shafts for the pinion gears 3, and each is configured so as to be supported at both ends by the axial outer end being inserted into the through-hole 21b of the body 21 and the axial inner end being inserted into a through-hole 5a of the pinion shaft holder 5. Hereinafter, the term "inner end" refers to an end portion positioned on a relatively inner side with respect to the radial direction of the spherical space. These pinion shafts 4 are inserted into center holes 3a of the pinion gears 3.

Each pinion shaft 4 is prevented from slipping out in the axial direction, as well as prevented from rotating, by a pin 8. This pin 8 is inserted extending through a pin insertion hole 21c provided intersecting the through-hole 21b in the body 21, as well as through a through-hole 4a in the pinion shaft 4. This pin 8 is prevented from slipping out by the joining surface of the cover 22.

Figure 2:
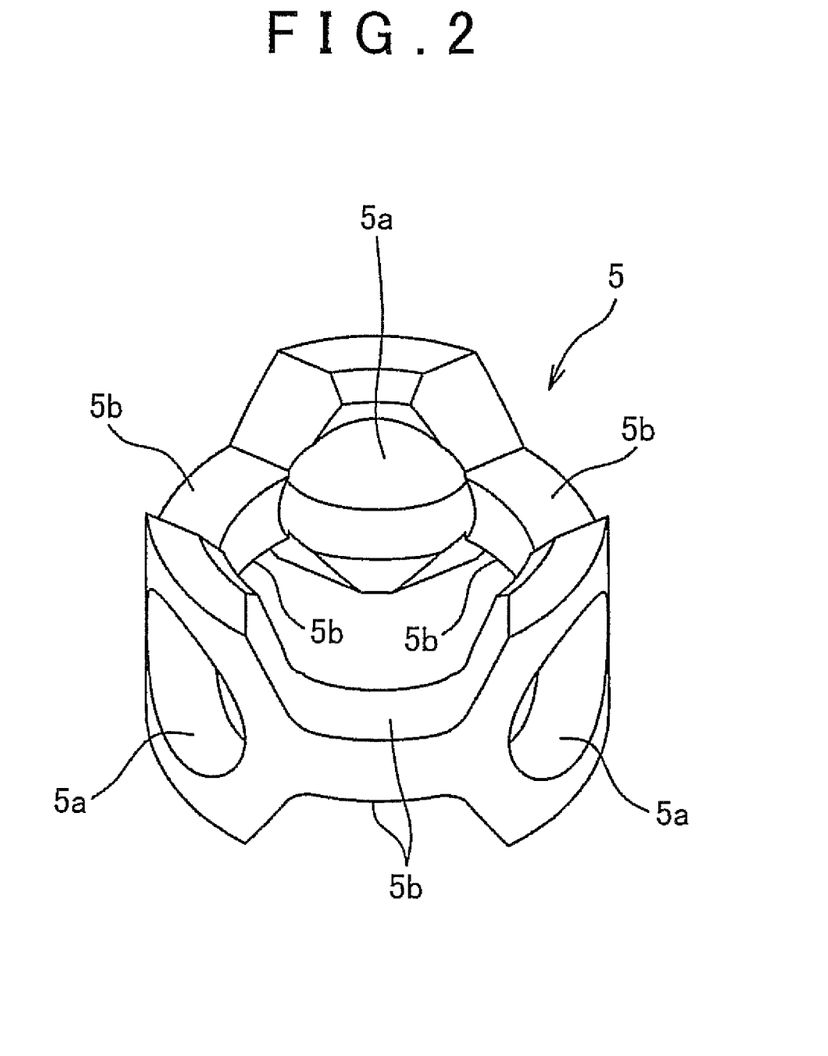
FIG. 2 is a perspective view of a pinion shaft holder shown in FIG. 1.
Figure 3:
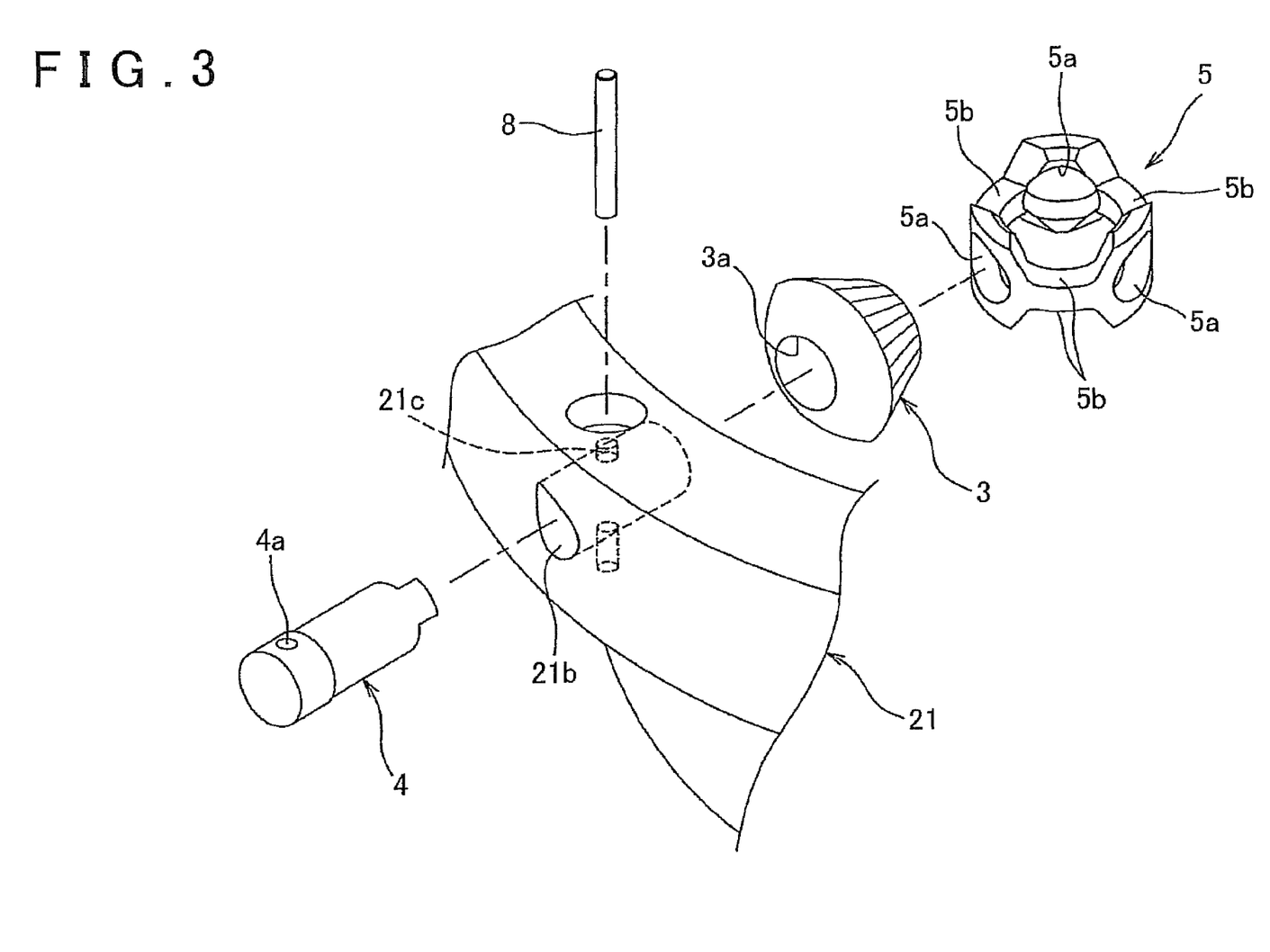
FIG. 3 is a perspective view of a body of a differential case, a pinion gear, a pinion shaft, and the pinion shaft holder shown in FIG. 1 all separated.

The pinion shaft holder 5 is arranged inside a space surrounded by the three pinion gears 3 and the two side gears 6 and 7, i.e., is housed in the space on the radial inside of the spherical space. Hereinafter, this space may be referred to as the radially inner space. This pinion shaft holder 5 is a cylindrical member having a smaller diameter than inscribed circles of a space surrounded by the three pinion gears 3, as shown in FIGS. 2 and 3. Through-holes 5a that pass through in the radial direction are provided in a plurality of locations (three locations in this example embodiment) on the circumference of a cylindrical portion of the pinion shaft holder 5. The axial inner end sides of the pinion shafts 4 fit loosely into these through-holes 5a.

The first side gear 6 is set inside the side boss portion 21a of the body 21 of the differential case 2 such that the center of a center hole in the first side gear 6 is concentric with the center of a center hole in the side boss portion 21a of the body 21.

The second side gear 7 is set inside the side boss portion 22a of the cover 22 of the differential case 2 such that the center of the center hole in the second side gear 7 is concentric with the center of a center hole in the side boss portion 22a of the cover 22.

A disc spring 9 and a thrust washer 10 are interposed between an outer end surface of the first side gear 6 and an inner end surface of the side boss portion 21a of the body 21 that oppose each other in the axial direction of the first side gear 6. Also, a disc spring 9 and a thrust washer 10 are also interposed between an outer end surface of the second side gear 7 and an inner end surface of the side boss portion 22a of the cover 22 that oppose each other in the axial direction of the second side gear 7.

By having the disc springs 9 respectively interposed in a compressed state between the first and second side gears 6 and 7 and the left and right side boss portions 21a and 22a of the differential case 2, the first and second side gears 6 and 7 are pushed against the three pinion gears 3 by the elastic restoring force of the disc springs 9, thereby reducing backlash between them.

The thrust washers 10 are sliding bearings that reduce the friction resistance of the left and right boss portions 21a and 22a of the differential case 2 when the first and second side gears 6 and 7 rotate, thus preventing the friction portions from seizing.

The first and second side gears 6 and 7 respectively include hollow shaft portions 61 and 71. Gear portions 62 and 72 formed by bevel gears are provided on one axial end side of hollow shaft portions 61 and 71, respectively. The gear portions 62 and 72 of the first and second side gears 6 and 7 are both each in mesh with the three pinion gears 3.

The hollow shaft portions 61 and 71 are rotatably inserted into the center holes of the side boss portions 21a and 22a of the differential case 2, respectively. Furthermore, small gaps are respectively formed, between inner peripheral surfaces of the center holes and the hollow shaft portions 61 and 71, near the inner side openings of the side boss portions 21a and 22a. Axial inner end portions of the pair of left and right drive shafts described above, not shown, are spline-engaged with the insides of the hollow shaft portions 61 and 71.

The operation of the differential 1 having this kind of structure will only be described in brief here.

First, when a vehicle is traveling straight ahead, for example, and rotative force is input to the differential case 2, the first and second side gears 6 and 7 and the right and left drive shafts, not shown, are rotatably driven by the three pinion gears 3 revolving together with the differential case 2, such that the left and right driving wheels are driven at the same rotation speed.

On the other hand, when there is a difference in the rotation resistance between the left and right rear wheels due to the vehicle traveling along a curve or the like, the three pinion gears 3 rotate (i.e., spin), and the first and second side gears 6 and 7 rotate differentially. As a result, the rotative force input to the differential case 2 is differentially distributed to the left and right driving wheels via the left and right drive shafts.

Figure 4:
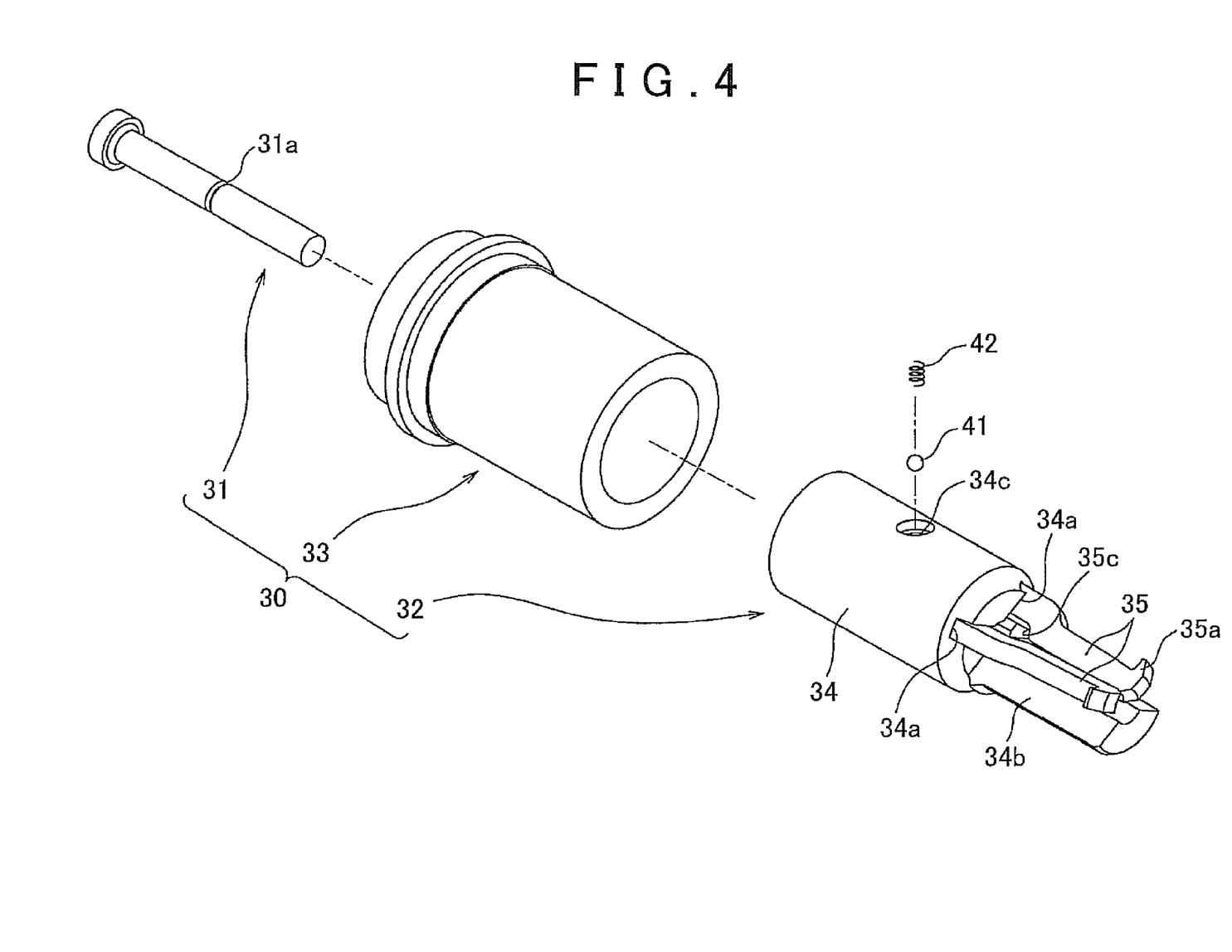
FIG. 4 is an exploded perspective view of an auxiliary tool used to assemble the differential shown in FIG. 1.
Figure 5:
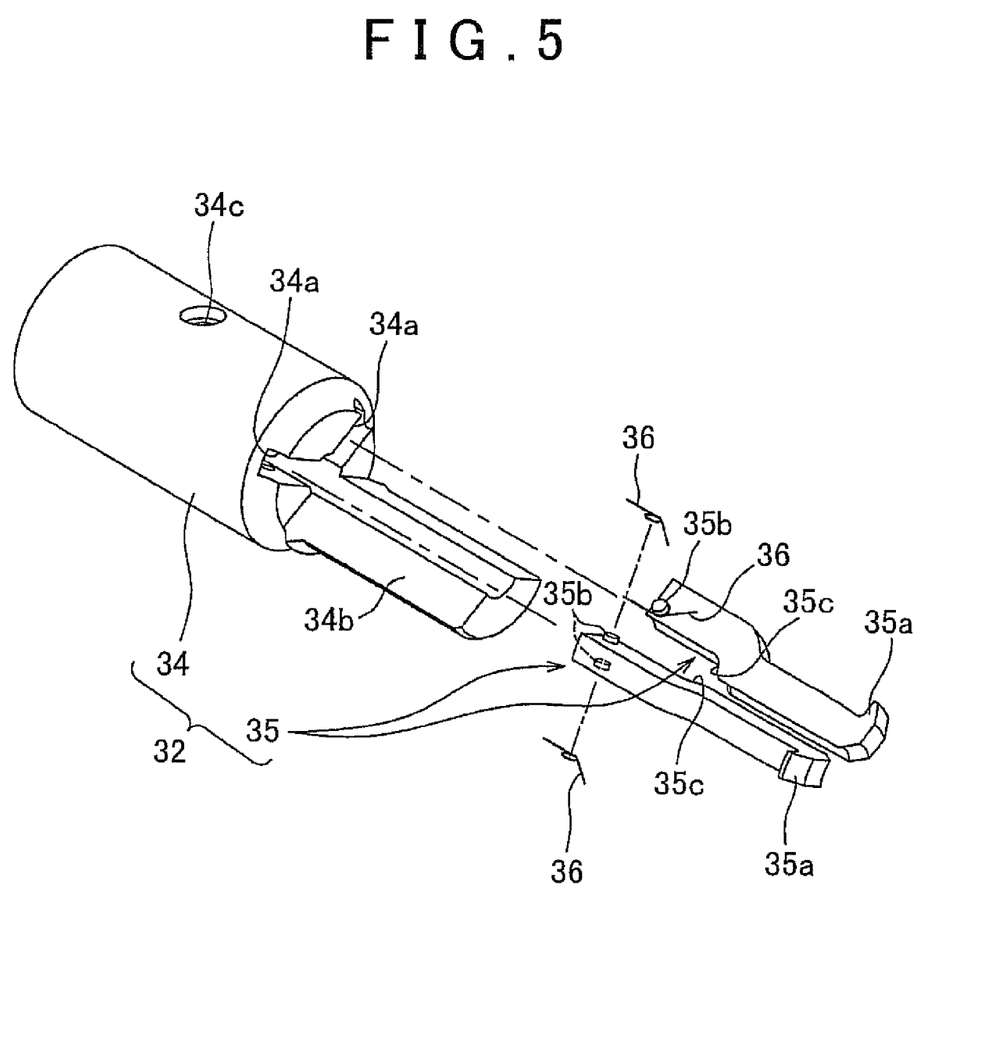
FIG. 5 is a perspective view illustrating the attaching structure of movable pieces with respect to an inner cylinder of the auxiliary tool shown in FIG. 4.

Next, before describing an assembly method of the preload-type differential 1 that uses the disc springs 9, the structure and operation of an auxiliary tool 30 used in this assembly will be described in detail with reference to FIGS. 4 and 5.

The auxiliary tool 30 includes a guide pin 31 and a slider 32 and the like. The guide pin 31 is fixed inside an outer cylinder 33. The slider 32 is fitted, in a manner relatively displaceable in the axial direction, to the radially outer side of the guide pin 31.

The slider 32 includes an inner cylinder 34, a plurality (two in this example embodiment) of movable pieces 35, and a plurality of torsion coil springs 36 of a number equal to the number of moveable pieces 35.

The inner cylinder 34 is fitted, in a manner relatively displaceable in the axial direction and the circumferential direction, to the inner periphery of the outer cylinder 33. Recessed portions 34a are formed in a plurality of circumferential locations (the same number as the number of moveable pieces 35) on the axial inner end side (i.e., the inner end side when the auxiliary tool 30 is inserted into the differential case 2) of the inner cylinder 34. The moveable pieces 35 are attached to the recessed portions 34a so as to be displaceable near and far with respect to (i.e., displaceable toward and away from) a central axis of the inner cylinder 34. In other words, the moveable pieces 35 are attached so as to be able to tilt radially inward and outward with respect to the auxiliary tool 30.

Also, a guide piece 34b that extends in the axial direction is provided between the recessed portions 34a provided on the inner cylinder 34.

Although it will be described in detail later, the guide piece 34b is provided to make it easier for pawl-like protrusions 35a of the moveable pieces 35 to hook onto an inner end surface of the gear portion 62 of the first side gear 6, when tilting the moveable pieces 35 radially outward while the two moveable pieces 35 are inserted in the center hole of the first side gear 6. Here, the inner end surface of the gear portion 62 faces the pinion shaft holder 5.

Each of these moveable pieces 35 has a band plate-shaped and has a pawl-like protrusion 35a. The pawl-like protrusion 35a protrudes in a direction orthogonal to a length direction of the moveable piece 35 and is provided on one end side in the length direction. The other end sides of the moveable pieces 35 in the length direction are attached to the recessed portions 34a of the inner cylinder 34.

More specifically, a spindle portion 35b is provided on both ends in the width direction, on the other axial end side of each of the moveable pieces 35. A tension coil spring 36 is wound around each of these spindle portions 35b. One end side of this tension coil spring 36 catches on the inner cylinder 34 side, and the other end side of the tension coil spring 36 catches on the moveable piece 35, such that the tension coil spring 36 is placed in a compressed state. The two moveable pieces 35 are urged closer to the central axis of the inner cylinder 34, i.e., so as to tilt radially inward, by the elastic restoring force from the compression of the tension coil springs 36.

Figure 6:
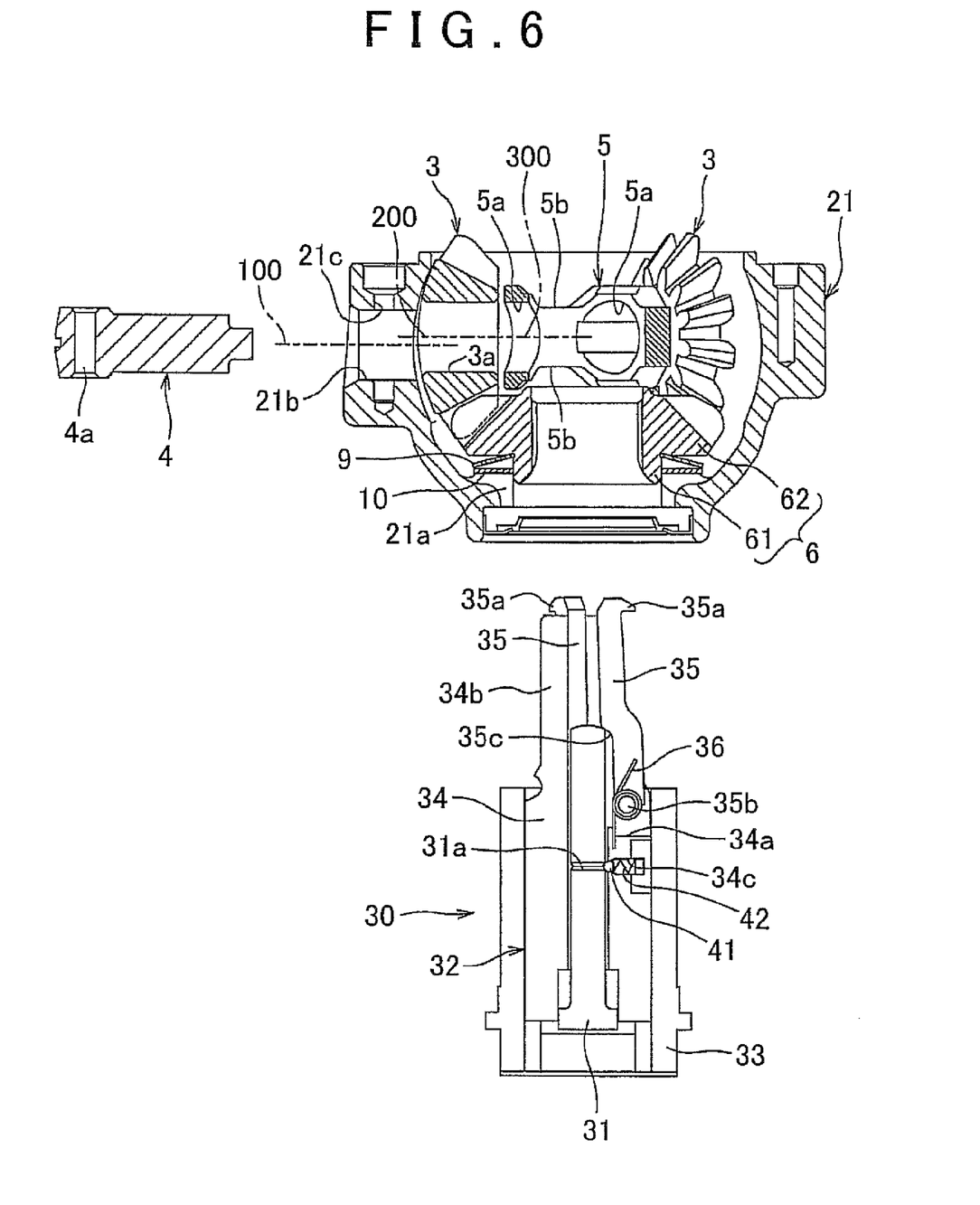
FIG. 6 is a view of a first step in an assembly method of the differential shown in FIG. 1.

That is, the two moveable pieces 35 are configured such that circumscribed circle diameters of the pawl-like protrusions 35a of the two moveable pieces 35 become smaller than the inside diameter of the inner cylinder 34 and the inside diameters of the center holes of the first and second side gears 6 and 7, by the two moveable pieces 35 being urged so as to constantly tilt radially inward from the spring force of the tension coil spring 36 (see FIG. 6, for example).

Also, when a tip end side of the guide pin 31 that is inserted into the inner cylinder 34 is pushed into the space surrounded by the two moveable pieces 35 and the one guide piece 34b, the moveable pieces 35 move away from the central axis of the inner cylinder 34, i.e., tilt radially outward, against the spring force of the tension coil spring 36. As a result, when the moveable pieces 35 tilt radially outward, a diameter of a circle contacting pawl-like protrusions 35a of the two moveable pieces 35 becomes larger than the inside diameter of the inner cylinder 34 and the inside diameters of the center holes of the first and second side gears 6 and 7 (see FIG. 8, for example).

In order to make it easier to push the guide pin 31 in, a tapered guide surface 35c is provided on an inside surface of each of the two moveable pieces 35. Also, positioning means (not denoted by a reference character) for positioning the guide pin 31 in the axial direction is provided midway in the length direction of the guide pin 31 and midway in the length direction of the inner cylinder 34.

This positioning means includes a circumferential groove 31a, a through-hole 34c, and a ball 41 and a compression coil spring 42 that are inserted into the through-hole 34c. The circumferential groove 31a is provided midway in the length direction of the guide pin 31. The through-hole 34c is provided along the radial direction midway in the length direction of the inner cylinder 34 of the slider 32, and an opening on a radially outer side of the inner cylinder 34 increases in diameter.

More specifically, the ball 41 and the compression coil spring 42 are housed in this order from the radial inside to the radial outside into the through-hole 34c of the inner cylinder 34. The compression coil spring 42 is in a compressed state by being pressed on (i.e., retained) by the outer cylinder 33 so as not to protrude radially outward. Therefore, the ball 41 is urged radially inward by the elastic restoring force of this compression coil spring 42.

Here, when a portion of the ball 41 is engaged with the circumferential groove 31a of the guide pin 31, the guide pin 31 and the slider 32 are positioned so as not to be relatively displaced in the axial direction. When positioned in this way, the guide pin 31 is not pushed into the space surrounded by the two moveable pieces 35 and the one guide piece 34b (see FIG. 6, for example). In this state, a diameter of a circle contacting the pawl-like protrusions 35a of the two moveable pieces 35 becomes smaller than the inside diameter of the inner cylinder 34 and the inside diameters of the center holes of the first and second side gears 6 and 7. This state, shown in FIG. 6, will be referred to as an "inoperative state".

Also, when the guide pin 31 and the slider 32 are relatively displaced in the axial direction by a slightly strong force, the ball 41 is pushed radially outward at an opening edge of the circumferential groove 31a. Therefore, the compression coil spring 42 is compressed further by the ball 41, and the ball 41 slips out of the circumferential groove 31a. As a result, relative displacement in the axial direction between the guide pin 31 and the inner cylinder 34 is possible. When relative displacement is possible in this way, the guide pin 31 is pushed into the space surrounded by the two moveable pieces 35 and the one guide piece 34b (see FIG. 8, for example). Also, the diameter of the circle contacting the pawl-like protrusions 35a of the two moveable pieces 35 become larger than the inside diameter of the inner cylinder 34 and the inside diameters of the center holes of the first and second side gears 6 and 7 against the spring force of the tension coil spring 36. This state, shown in FIG. 8, will be referred to as an "operative state".

Next, the way in which the auxiliary tool 30 described above is used, together with the assembly method of the differential 1, will be described in detail with reference to FIGS. 6 to 10.

First, the disc spring 9 and the thrust washer 10 are arranged on the inside surface of the side boss portion 21a in the body 21 of the differential case 2, and then the first side gear 6 is set in. Furthermore, the three pinion gears 3 are set so as to be in mesh with this first side gear 6, as shown in FIG. 6. Next, the pinion shaft holder 5 is set into the radial inner space surrounded by the three pinion gears 3.

In this step, the disc spring 9 is in a natural state in which it is not compressed, so the first side gear 6 is lifted upward. That is, the first side gear 6 is lifted upward with respect to the direction of gravitational force. Therefore, centers 200 of the center holes 3a of the pinion gears 3 and centers 300 of the through-holes 5a of the pinion shaft holder 5 are radially offset such that they are not concentrically aligned with centers 100 of the through-holes 21b of the body 21.

Figure 7:
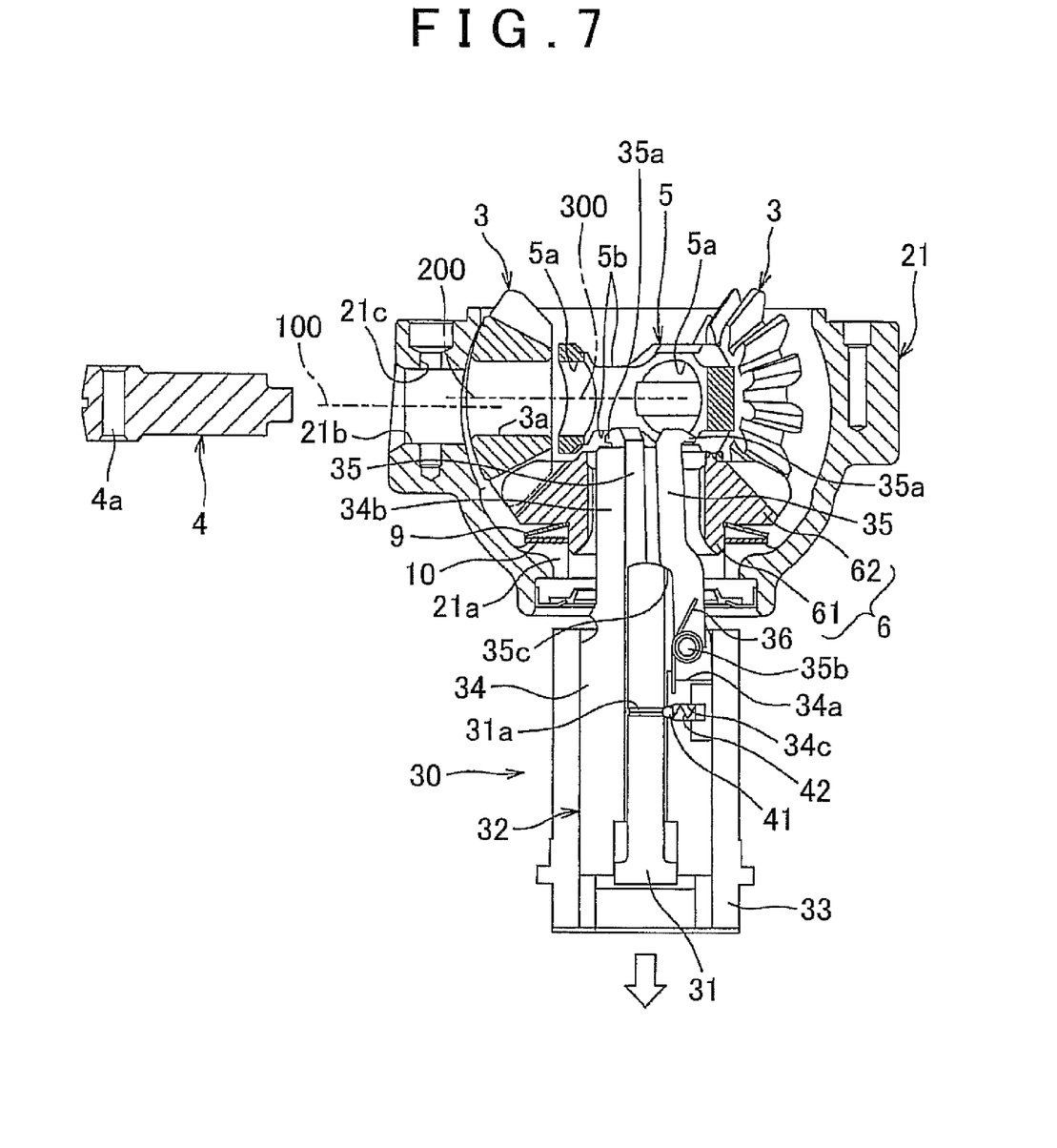
FIG. 7 is a view of a second step in the assembly method of the differential shown in FIG. 1.

In such a state, the two moveable pieces 35 and the one guide piece 34b is inserted from the outside into the center hole of the side boss portion 21a of the body 21 of the differential case 2 while the auxiliary tool 30 is placed in the inoperative state shown in FIG. 6. At this time, the pawl-like protrusions 35a of the two moveable pieces 35 are away from, above, the inner end surface of the gear portion 62 of the first side gear 6, as shown in FIG. 7.

Next, the auxiliary tool 30 is placed in the operative state. That is, the tip end of the guide pin 31 is guided along the tapered guide surfaces 35c of the two moveable pieces 35 by fixing the guide pin 31 and sliding the slider 32 down as shown by the arrow in FIG. 7. Thus, the tip end of the guide pin 31 is inserted into the space surrounded by the two moveable pieces 35 and the one guide piece 34b.

Figure 8:
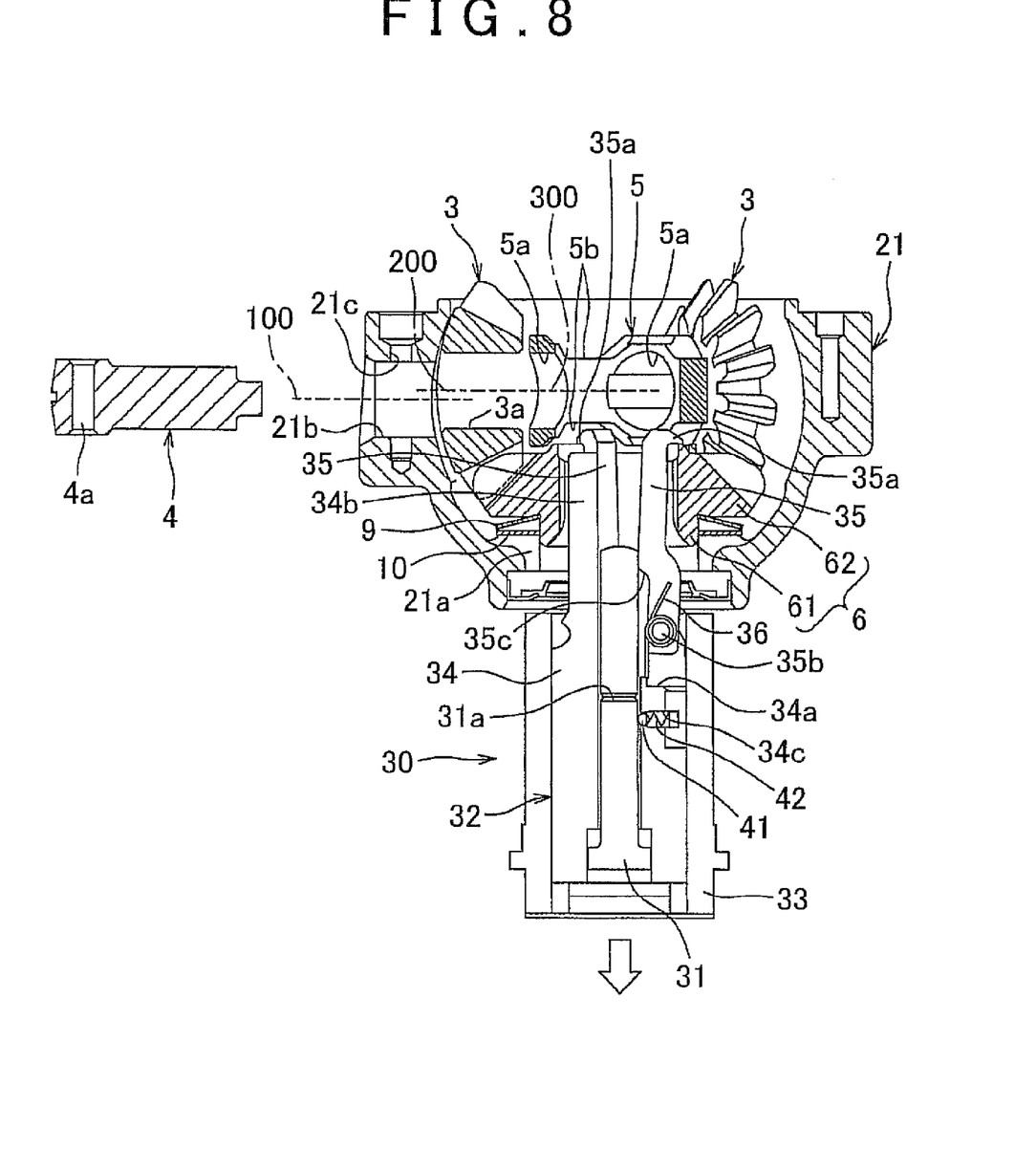
FIG. 8 is a view of a third step in the assembly method of the differential shown in FIG. 1.

As a result, the two moveable pieces 35 are tilted radially outward against the spring force of the tension coil springs 36, and the pawl-like protrusions 35a of the two moveable pieces 35 are hooked onto the inner end surface of the gear portion 62 of the first side gear 6, as shown in FIG. 8.

In this kind of state, by sliding the slider 32 further downward as shown by the arrow in FIG. 8, the disc spring 9 is compressed by the first side gear 6 when the first side gear 6 is lowered together with the slider 32.

As a result, the pinion shaft holder 5 and the three pinion gears 3 that are in mesh with the first side gear 6 move downward by their own weight. Thus, the centers 200 of the center holes 3a of the pinion gears 3 and the centers 300 of the through-holes 5a of the pinion shaft holder 5 become concentrically aligned with the centers 100 of the through-holes 21b of the body 21, as shown in FIG. 9.

Figure 9:
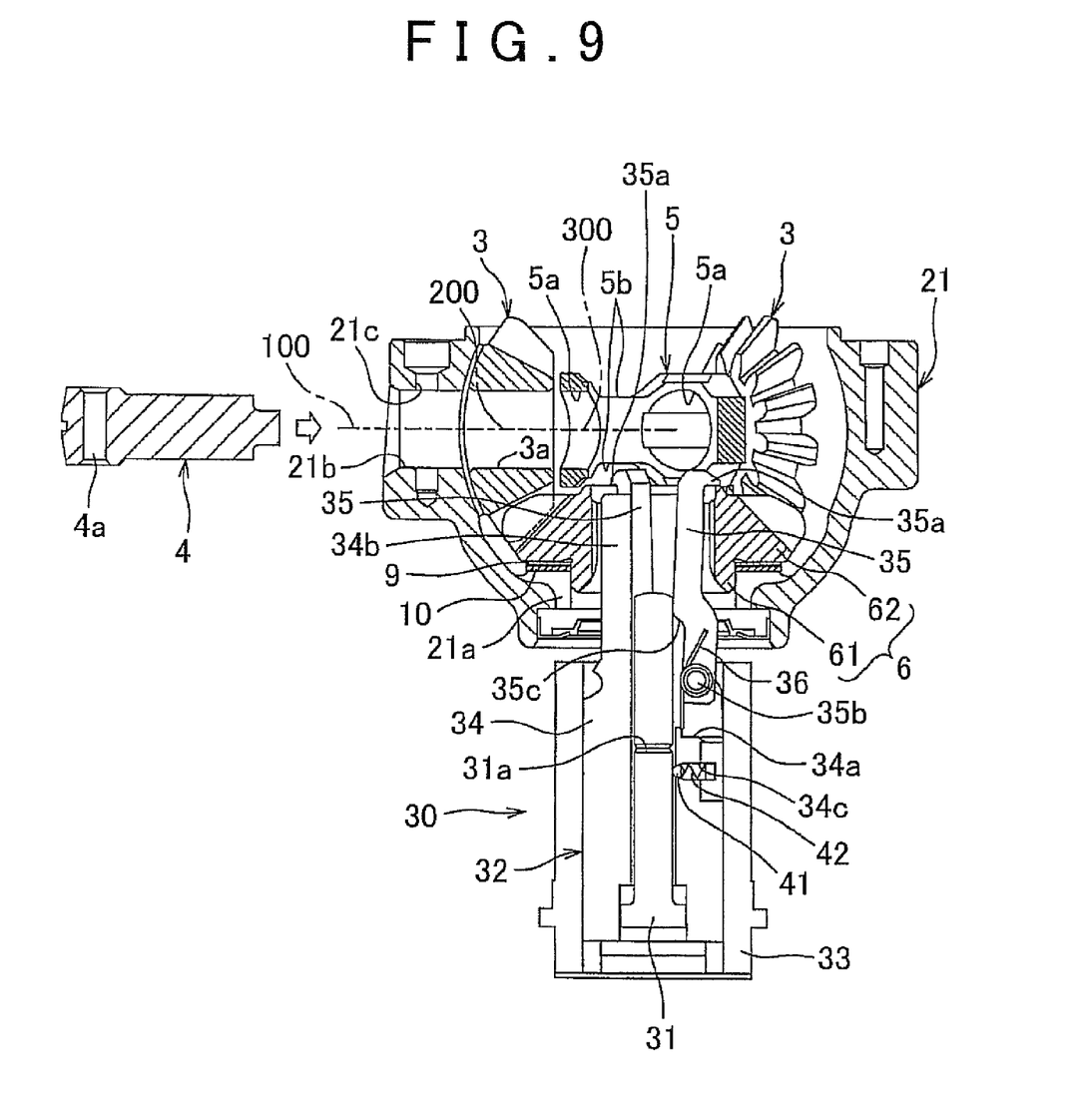
FIG. 9 is a view of a fourth step in the assembly method of the differential shown in FIG. 1.

In this state, by inserting the pinion shafts 4 into the through-holes 21b of the body 21 from the outside, the pinion shafts 4 are able to be inserted into both the center holes 3a of the pinion gears 3 and the through-holes 5a of the pinion shaft holder 5, as shown by the arrow in FIG. 9.

Figure 10:
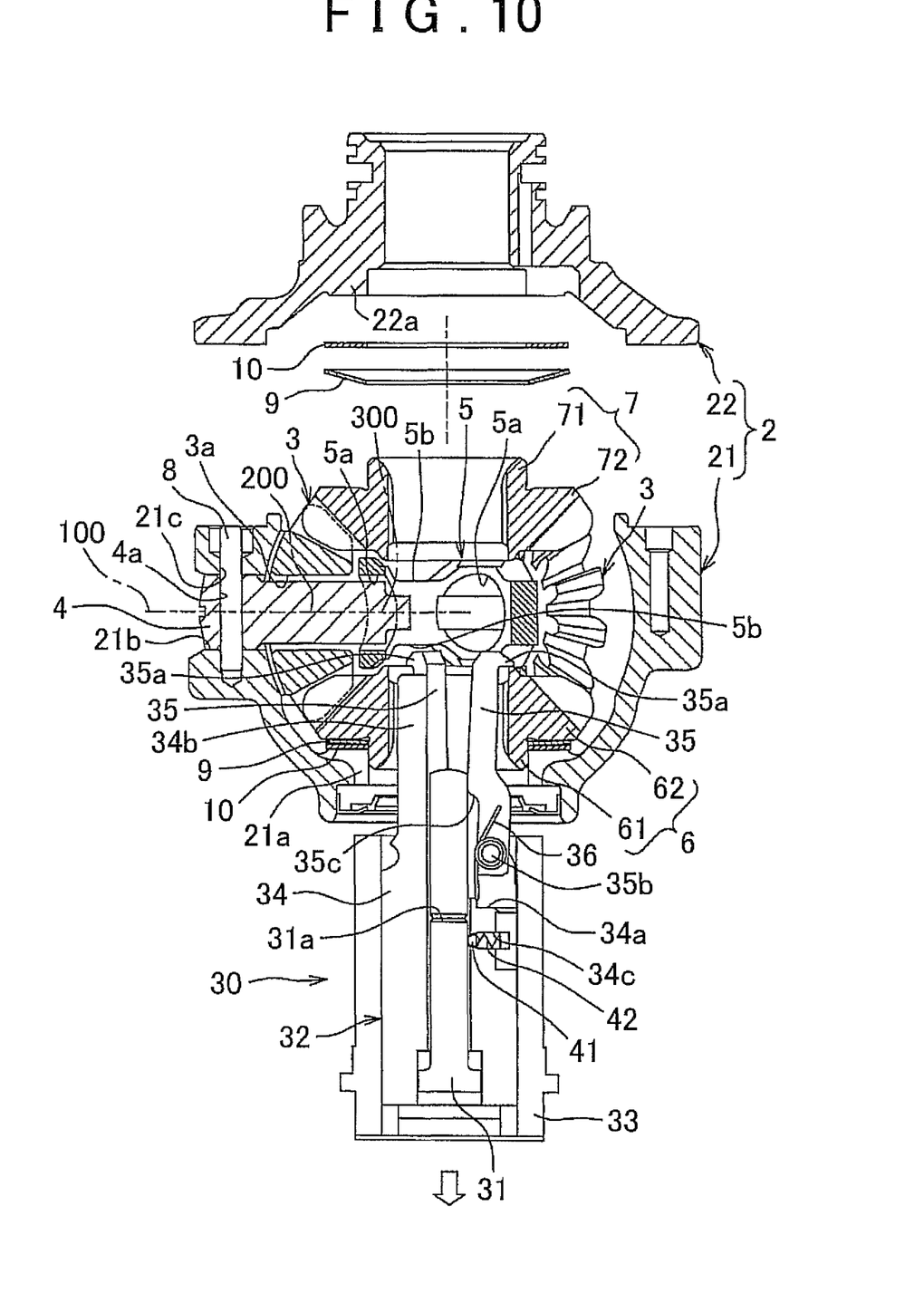
FIG. 10 is a view of a fifth step in the assembly method of the differential shown in FIG. 1.

Then, the pins 8 are inserted into the pin insertion holes 21c provided intersecting the through-holes 21b of the body 21 and the through-holes 4a of the pinion shafts 4, as shown in FIG. 10. Further, the second side gear 7, the disc spring 9, and the thrust washer 10 are assembled to the body 21, and the cover 22 is attached by a bolt to the body 21.

Then, as shown by the arrow in FIG. 10, the tip end of the guide pin 31 is withdrawn from the space surrounded by the two moveable pieces 35 and the one guide piece 34b by sliding the guide pin 31 downward with respect to the slider 32 in the auxiliary tool 30. As a result, the two moveable pieces 35 tilt radially inward by the elastic restoring force of the tension coil springs 36. Accordingly, the pawl-like protrusions 35a of the two moveable pieces 35 separate from the inner end surface of the gear portion 62 of the first side gear 6 and are pulled to the radial inside of the center hole of the first side gear 6.

Next, the auxiliary tool 30 is pulled out the first side gear 6 and the side boss portion 21a of the body 21 by pulling the entire auxiliary tool 30 downward.

In this way, the auxiliary tool 30 is used to compress the disc spring 9 that is interposed between the surface of the side boss portion 21a of the body 21 of the differential case 2 and the surface of the gear portion 62 of the first side gear 6, and then keep the disc spring 9 in this compressed state, before the pinion shafts 4 are assembled to the three pinion gears 3 when assembling the differential 1. In particular, with the auxiliary tool 30 having a structure such as that described in this example embodiment, once the disc spring 9 has been compressed, the compressed state is able to be maintained relatively easily.

In this example embodiment, recessed portions 5b are provided on the pinion shaft holder 5. Therefore, in the assembly process described above, the possibility is reduced that the pawl-like protrusions 35a of the auxiliary tool 30 interfere with the pinion shaft holder 5 when the pinion shaft holder 5 is assembled with the pawl-like protrusions 35a hooked onto the inner end surface of the gear portion 62 of the first side gear 6.

These recessed portions 5b are provided recessed toward the axial center of the pinion shaft holder 5 on both axial end portions of the cylindrical pinion shaft holder 5, as shown in FIGS. 2 and 3. Also, the recessed portions 5b are provided in regions corresponding to the center holes of the first and second side gears 6 and 7. In particular, in this example embodiment, the recessed portions 5b are provided in regions between the three through-holes 5a provided in the pinion shaft holder 5, i.e., regions in three locations.

When the recessed portions 5b are provided in this way, the pinion shaft holder 5 is bilaterally symmetrical with respect to a plane orthogonal to the axial center of the pinion shaft holder 5. The reason for making the pinion shaft holder 5 bilaterally symmetrical in this way is so as to not limit the arrangement phase of the through-holes 5a or the assembly direction when assembling the pinion shaft holder 5 inside the body 21 of the differential case 2, as well as to improve the weight balance of the pinion shaft holder 5 when the pinion shaft holder 5 rotates as the three pinion gears 3 revolve.

The lengths of the recessed portions 5b in the axial direction of the pinion shaft holder 5 are set to dimensions such that the tip ends of the two moveable pieces 35 (i.e., the pawl-like protrusions 35a) will not interfere with the pinion shaft holder 5 when the two moveable pieces 35 and the one guide piece 34b are inserted into the center hole of the first side gear 6 and the first side gear 6 is slid downwards, as shown in FIG. 8, for example.

Also, the lengths of the recessed portions 5b in the circumferential direction of the pinion shaft holder 5 are set to dimensions such that the recessed portions 5b will not interfere with the pawl-like protrusions 35a that move as a result of the two moveable pieces 35 of the auxiliary tool 30 tilting radially outward.

Setting the dimensions in this way makes it possible to reliably avoid the auxiliary tool 30 interfering with the pinion shaft holder 5 while the disc spring 9 is maintained in the compressed state by the auxiliary tool 30.

As described above, in the example embodiment to which the invention has been applied, the recessed portions 5b are provided on the pinion shaft holder 5 to prevent the pawl-like protrusions 35a from interfering with the pinion shaft holder 5 that is placed on the inner end surface of the first side gear 6, while the pawl-like protrusions 35a of the two moveable pieces 35 of the auxiliary tool 30 are hooked onto the inner end surface of the gear portion 62 in the process of assembling the differential 1.

Also, the disc spring 9 is arranged between the surface of the first side gear 6 and the surface of the side boss portion 21a of the body 21 that oppose each other in the axial direction of the first side gear 6. Then, the disc spring 9 is compressed and maintained in this compressed state by the auxiliary tool 30, before the pinion shafts 4 are assembled to the three pinion gears 3. In this compressed state, because the recessed portions 5b are provided on the pinion shaft holder 5, the possibility is reduced that the pawl-like protrusions 35a of the moveable pieces 35 of the auxiliary tool 30 interfere with the pinion shaft holder 5.

Therefore, by using the auxiliary tool 30, the centers 200 of the center holes 3a of the three pinion gears 3 and the centers 300 of the three through-holes 5a of the pinion shaft holder 5 are able to be concentrically aligned with the centers 100 of the three through-holes 21b of the body 21.

Thus, the assembly operation is able to be performed easily and quickly, e.g., the pinion shafts 4 are able to be easily assembled extending through the through-holes 21b of the body 21, the center holes 3a of the pinion gears 3, and the through-holes 5a of the pinion shaft holder 5. As a result, the manufacturing cost of the differential 1 is able to be reduced.

The invention is not limited to only the example embodiments described above. That is, the invention also includes all modifications and applications that are within the scope, and meanings equivalent to the scope, of the claims for patent. Hereinafter, another example embodiment of the invention will be given as an example.

In the example embodiment described above, the differential 1 includes the three pinion gears 3, but the invention is not limited to this. That is, the number of pinion gears 3 used may be set appropriately as long as it is two or more.

In the example embodiment described above, the auxiliary tool 30 includes the two moveable pieces 35, but the invention is not limited to this. For example, as long as the auxiliary tool 30 is configured to hook the pawl-like protrusions 35a of the moveable pieces 35 cm the inner end surface of the gear portion 62 of the first side gear 6 when compressing the disc spring 9, the structures of the details of the auxiliary tool 30 are not particularly limited.

In the example embodiment described above, a case in which the spring used for applying a preload to the differential 1 is the disc spring 9 is given as an example, but the invention is not limited to this. That is, the type of this spring is not particularly limited.

The invention may be applied to a differential having a structure in which a spring that applies a preload for pushing a side gear against a plurality of pinion gears is interposed in a compressed state between a surface of a first side boss portion of a differential case and a corresponding surface of a first side gear, the surfaces opposing each other in the axial direction of the first side gear, and between a surface of a second side boss portion of the differential case and a corresponding surface of a second side gear, the surfaces opposing each other in the axial direction of the second side gear, as well as to an assembly method for this differential.

What is claimed is:

1. A differential comprising:
    a differential case having a first side boss portion and a second side boss portion;
    a first side gear and a second side gear;
    a plurality of pinion gears;
    a first spring interposed in a compressed state between a surface of the first side boss portion and a corresponding surface of the first side gear, the surfaces opposing each other in an axial direction of the first side gear;
    a second spring interposed in a compressed state between a surface of the second side boss portion and a corresponding surface of the second side gear, the surfaces opposing each other in an axial direction of the second side gear;
    a plurality of pinion shafts, each of which is inserted from outside of the differential case, extending through a center hole in a corresponding one of the plurality of pinion gears and a corresponding through-hole provided in the differential case; and
    a pinion shaft holder that is arranged in a space surrounded by the plurality of pinion gears, and has a plurality of through-holes into each of which an axial end portion of a corresponding one of the plurality of pinion shafts fits, wherein: the first spring applies a preload for pushing the first side gear against the plurality of pinion gears;
    the second spring applies a preload for pushing the second side gear against the plurality of pinion gears; and
    recessed portions are provided on the pinion shaft holder and are configured to avoid interference with an auxiliary tool that keeps one of the first spring and the second spring in the compressed state.

2. The differential according to claim 1, wherein:
    the pinion shaft holder is a cylindrical member having a diameter smaller than an inscribed circle of the space surrounded by the plurality of pinion gears;

the plurality of through-holes of the pinion shaft holder pass through a cylindrical portion of the pinion shaft holder in a radial direction; and the recessed portions are respectively provided, in a region corresponding to the center hole of the first side gear and in a region corresponding to the center hole of the second side gear, in both axial end portions of the pinion shaft holder, and are recessed toward an axial center of the pinion shaft holder.

3. The differential according to claim 1, wherein
one of the first spring and the second spring is compressed and maintained in the compressed state using the auxiliary tool before one of the plurality of pinion shafts is assembled to a corresponding one of the plurality of pinion gears.

4. The differential according to claim 1, wherein:
the auxiliary tool has a movable piece that is inserted, from outside of the differential case, into the center hole of one of the first side boss portion and the second side boss portion and the center hole of a corresponding one of the fast side gear and the second side gear;

the movable piece is tilted outward in a radial direction of the pinion shaft holder after being inserted into the center hole of the one side boss portion and the center hole of the corresponding one side gear;

the movable piece has a protrusion that hooks onto a surface, on the space side, of the corresponding one side gear when the movable piece is tilted; and the recessed portions of the pinion shaft holder are configured to avoid interference with the protrusion that is hooked onto the surface, on the space side, of the corresponding one side gear.

5. A differential comprising:
a differential case having a side boss portion;
a side gear;
a pinion gear;
a spring interposed in a compressed state between a surface of the side boss portion and a corresponding surface of the side gear, the surfaces opposing each other in an axial direction of the side gear;

a pinion shaft that is inserted from outside of the differential case and extends through a center hole of the pinion gear and a through-hole of the differential case; and a pinion shaft holder that is a cylindrical member and has a through-hole into which an axial end portion of the pinion shaft fits, wherein: a recessed portion is provided in an axial end portion of the pinion shaft holder and is recessed toward an axial center of the pinion shaft holder; and the spring applies a preload for pushing the side gear against the pinion gear.

6. An assembly method of a differential,
wherein: the differential includes a differential case having a side boss portion, a side gear, a pinion gear, a pinion shaft, a spring, and a pinion shaft holder that is a cylindrical member;

the spring is interposed in a compressed state between a surface of the side boss portion and a corresponding surface of the side gear, the surfaces opposing each other in an axial direction of the side gear;

the pinion shaft holder has a through-hole into which an axial end portion of the pinion shaft fits, and a recessed portion;

the recessed portion is recessed toward an axial center of the pinion shaft holder and on an axial end portion of the pinion shaft holder; and the through-hole of the pinion shaft holder passes through a cylindrical portion of the pinion shaft holder in a radial direction, the assembly method comprising:

inserting an auxiliary tool from outside of the differential case into a center hole of the side boss portion;

compressing the spring by hooking the auxiliary tool onto a surface of the side gear that faces the pinion shaft holder;

maintaining the spring in the compressed state by the auxiliary tool; and while the spring is in the compressed state, inserting the pinion shaft from outside of the differential case so that the pinion shaft extends through a center hole provided in the pinion gear and a through-hole provided in the differential case.

\* \* \* \* \*